United States Patent
Shih

(10) Patent No.: US 10,063,169 B2
(45) Date of Patent: Aug. 28, 2018

(54) METHOD OF CONTROLLING ROTATIONAL SPEED OF MOTOR OF ELECTRIC BED

(71) Applicant: Chuan-Hang Shih, Changhua County (TW)

(72) Inventor: Chuan-Hang Shih, Changhua County (TW)

( * ) Notice: Subject to any disclaimer, the term of this patent is extended or adjusted under 35 U.S.C. 154(b) by 97 days.

(21) Appl. No.: 14/978,461

(22) Filed: Dec. 22, 2015

(65) Prior Publication Data

US 2017/0047874 A1    Feb. 16, 2017

(30) Foreign Application Priority Data

Aug. 10, 2015    (TW) .............................. 104125901 A

(51) Int. Cl.
| | |
|---|---|
| *H02P 5/68* | (2006.01) |
| *H02P 7/285* | (2016.01) |
| *A47C 20/04* | (2006.01) |
| *H02P 29/00* | (2016.01) |

(52) U.S. Cl.
CPC .......... *H02P 7/2855* (2013.01); *A47C 20/041* (2013.01); *H02P 5/68* (2013.01); *H02P 29/0016* (2013.01)

(58) Field of Classification Search
CPC ...... H02P 7/2855; H02P 5/68; H02P 29/0016; A47C 20/041
USPC ........................................................ 388/809
See application file for complete search history.

(56) References Cited

U.S. PATENT DOCUMENTS

| | | | | |
|---|---|---|---|---|
| 5,587,635 | A * | 12/1996 | Watanabe .......... | G05B 19/4065 318/271 |
| 5,940,911 | A * | 8/1999 | Wang ................... | A47C 19/045 5/147 |
| 6,115,861 | A * | 9/2000 | Reeder ............... | A61G 7/05776 5/690 |
| 7,520,006 | B2 * | 4/2009 | Menkedick ....................... | 5/600 |
| 2004/0075405 | A1 * | 4/2004 | Brixius .................. | B65G 43/10 318/69 |
| 2005/0116668 | A1 * | 6/2005 | Bastholm .................. | H02P 7/28 318/34 |
| 2006/0087263 | A1 * | 4/2006 | Sa ......................... | D06F 37/304 318/66 |
| 2008/0018281 | A1 * | 1/2008 | Kim ........................ | H02P 6/34 318/445 |

(Continued)

*Primary Examiner* — Kawing Chan
(74) *Attorney, Agent, or Firm* — Muncy, Geissler, Olds & Lowe, P.C.

(57) ABSTRACT

A method of controlling a rotational speed of a motor of an electric bed includes the following steps. (A) Use a sensor to detect rotation of the motor, set a predetermined rotational speed of the motor in a microcontroller, and use the microcontroller to calculate actual rotational speeds of the motor. (B) Use the microcontroller to calculate an average actual rotational speed of the motor at each of sampling time points in a predetermined period. (C) Use the microcontroller to compare the average actual rotational speed of the motor with the predetermined rotational speed to obtain a difference signal. (D) Input the difference signal to a driver circuit to adjust the rotational speed of the motor until the average actual rotational speed of the motor is equal to the predetermined rotational speed. In this way, the motor of the electric bed can approximately rotate in the predetermined rotational speed.

16 Claims, 4 Drawing Sheets

(56) References Cited

U.S. PATENT DOCUMENTS

| | | | | |
|---|---|---|---|---|
| 2008/0289108 A1* | 11/2008 | Menkedick | ........... | A61G 7/0528 |
| | | | | 5/610 |
| 2010/0042262 A1* | 2/2010 | Niezgoda | ........... | B01D 46/0038 |
| | | | | 700/282 |
| 2010/0212087 A1* | 8/2010 | Leib | ............ | G06F 19/327 |
| | | | | 5/81.1 R |
| 2011/0029169 A1* | 2/2011 | Kell | ............ | A61G 5/043 |
| | | | | 701/22 |
| 2013/0289770 A1* | 10/2013 | Rawls-Meehan | ...... | G05B 15/02 |
| | | | | 700/275 |
| 2014/0159410 A1* | 6/2014 | Rasmussen | ............ | A47C 19/20 |
| | | | | 296/24.33 |
| 2015/0182397 A1* | 7/2015 | Palashewski | ........... | A47C 27/00 |
| | | | | 5/616 |
| 2017/0035632 A1* | 2/2017 | Shih | ............ | A61G 7/018 |

* cited by examiner

METHOD OF CONTROLLING ROTATIONAL SPEED OF MOTOR OF ELECTRIC BED

BACKGROUND

1. Technical Field

The present invention relates to an electric bed, and more particularly, to a method of controlling rotational speed of a motor of an electric bed.

2. Description of Related Art

In general, an electric bed includes at least one movable bed plate, a fixed bed frame and an actuator. The movable bed plate is rotatably connected with the fixed bed frame, and the actuator is connected between the movable bed plate and the fixed bed frame to drive the movable bed plate to swing relative to the fixed bed frame. The actuator includes a motor to serve as a source of a motive force which must produce so high rotational speed as to overcome the load the actuator bears, and the load includes the mechanical resistance of the electric bed and the weight of the user. Because the electric beds have unequal mechanical resistances and the users thereof are of unequal weight, the motors of the electric beds even having the same specification still rotate in different speeds, which brings the users different usage experiences so as to reduce the users' trust in the quality of the electric bed. In addition, the double electric bed includes two electric single beds, the movable bed plates of which are driven by two motors, respectively. If the rotational speeds of the two motors are unequal to each other, the movable bed plates can not swing synchronously, which makes the motion of the double electric bed look not fine but rough so that the double electric bed is hard to impress and attract the user.

SUMMARY

To solve the above-mentioned problems, an objective of the present invention is to provide a method to adjust the rotational speed of the motor of the electric bed, so as to control the motor to maintain a predetermined rotational speed under different loads.

To attain the above objective, the present invention provides a method of controlling a rotational speed of a motor of an electric bed. The motor is driven and controlled by a driver circuit. The method includes the following steps. (A) Use a sensor to detect rotation of the motor to output a sensing signal, set a predetermined rotational speed of the motor in a microcontroller, and use the microcontroller to calculate actual rotational speeds of the motor according to the sensing signal while the motor is in operation. (B) Use the microcontroller to calculate an average actual rotational speed of the motor at each of sampling time points in a predetermined period, wherein the average actual rotational speed equals a total rotational speed divided by an accumulative time from beginning of the predetermined period till the sampling time point when the average actual rotational speed is calculated, and the total rotational speed is a summation of the actual rotational speeds obtained from the beginning of the predetermined period till the sampling time point when the average actual rotational speed is calculated. (C) Use the microcontroller to compare the average actual rotational speed of the motor obtained at each of the sampling time points with the predetermined rotational speed to obtain a difference signal. (D) Input the difference signal obtained at each of the sampling time points to the driver circuit to adjust the rotational speed of the motor until the average actual rotational speed of the motor is equal to the predetermined rotational speed.

To attain the above objective, the present invention further provides a method of controlling rotational speeds of motors of an electric bed which is a double electric bed having two electric single beds, two driver circuits and two motors. The two driver circuits are attached to the two electric single beds, respectively. The two motors are electrically connected with and driven and controlled by the two driver circuits, respectively. The method includes the following steps. (A) Use two sensors to respectively detect rotation of the two motors to output two sensing signals respectively, set predetermined rotational speeds of the two motors, which are equal to each other, in two microcontrollers respectively, and use the two microcontrollers to respectively calculate actual rotational speeds of the two motors according to the two sensing signals respectively while the motors are in operation. (B) Use the two microcontrollers to respectively calculate average actual rotational speeds of the two motors at each of sampling time points in a predetermined period, wherein the average actual rotational speed equals a total rotational speed divided by an accumulative time from beginning of the predetermined period till the sampling time point when the average actual rotational speed is calculated, and the total rotational speed is a summation of the actual rotational speeds obtained from the beginning of the predetermined period till the sampling time point when the average actual rotational speed is calculated. (C) Use the two microcontrollers to respectively compare the average actual rotational speeds of the two motors obtained at each of the sampling time points with the predetermined rotational speeds to obtain two difference signals, respectively. (D) Input the two difference signals obtained at each of the sampling time points to the two driver circuits respectively to adjust the rotational speeds of the motors until the average actual rotational speeds of the two motors are equal to the predetermined rotational speeds, thereby synchronizing motions of the two electric single beds.

Therefore, by controlling the average actual rotational speed of the motor to be equal to the predetermined rotational speed, the method of the present invention can bring the user the same usage experience in every time of using the electric bed. Besides, the method of the present invention can make the movable bed plates of the two electric single beds of the double electric bed swing synchronously, so that the double electric bed can perform synchronized and fine motion.

DESCRIPTION OF THE EXEMPLARY EMBODIMENTS

Figure 1:
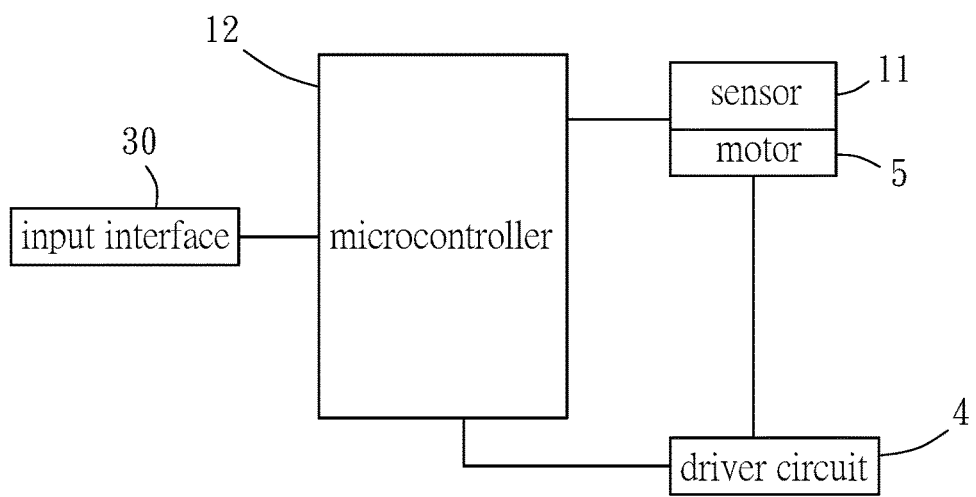
FIG. 1 is a schematic block diagram showing the electrical arrangement of a first embodiment of the present invention.

The present invention provides a method of controlling the rotational speed of a motor of an electric bed. Referring to FIG. 1, the electric bed includes a driver circuit 4 and a motor 5 which is electrically connected with the driver circuit 4 and controlled by the driver circuit 4 to drive the motion of the electric bed.

As shown in FIG. 1, the method of controlling the rotational speed of the motor 5 of the electric bed according to a first embodiment of the present invention is performed by means of a sensor 11, a microcontroller 12 and an input interface 30.

The sensor 11 is disposed in the motor 5 to detect the rotation of the motor 5 to output a sensing signal. For example, the sensor 11 may be a Hall sensor which outputs a current signal changed periodically according to the variation of the magnetic field of the motor 5.

The microcontroller 12 is electrically connected with the sensor 11 and the driver circuit 4 for being set with a predetermined rotational speed of the motor 5, receiving the sensing signal from the sensor 11, and calculating actual rotational speeds of the motor 5 according to the sensing signal while the motor 5 is in operation. For example, if the sensing signal is changed periodically for 30 times in one second, the actual rotational speed of the motor 5 in the second is 30 revolutions per second (hereinafter referred to as "RPS").

The microcontroller 12 is also used for setting a predetermined period and calculating an average actual rotational speed at each of sampling time points in the predetermined period. The average actual rotational speed equals a total rotational speed divided by an accumulative time from beginning of the predetermined period till the sampling time point when the average actual rotational speed is calculated, and the total rotational speed is a summation of the actual rotational speeds obtained from the beginning of the predetermined period till the sampling time point when the average actual rotational speed is calculated.

The microcontroller 12 is further used to compare the predetermined rotational speed with the average actual rotational speed, and adjust the voltage outputted to the motor 5 according to the comparison result, so as to adjust the rotational speed of the motor 5. After that, the microcontroller 12 repeats the steps of calculating the actual rotational speed of the motor 5 according to the sensing signal from the sensor 11 disposed in the motor 5, calculating the average actual rotational speed, comparing the speeds, and controlling the motor until the average actual rotational speed of the motor 5 is equal to the predetermined rotational speed.

The input interface 30 is electrically connected with the microcontroller 12. Through the input interface 30, the user can conveniently do the necessary setting in the microcontroller 12, such as the setting of the predetermined rotational speed, the predetermined period, a predetermined position of the electric bed, and so on.

Figure 2:
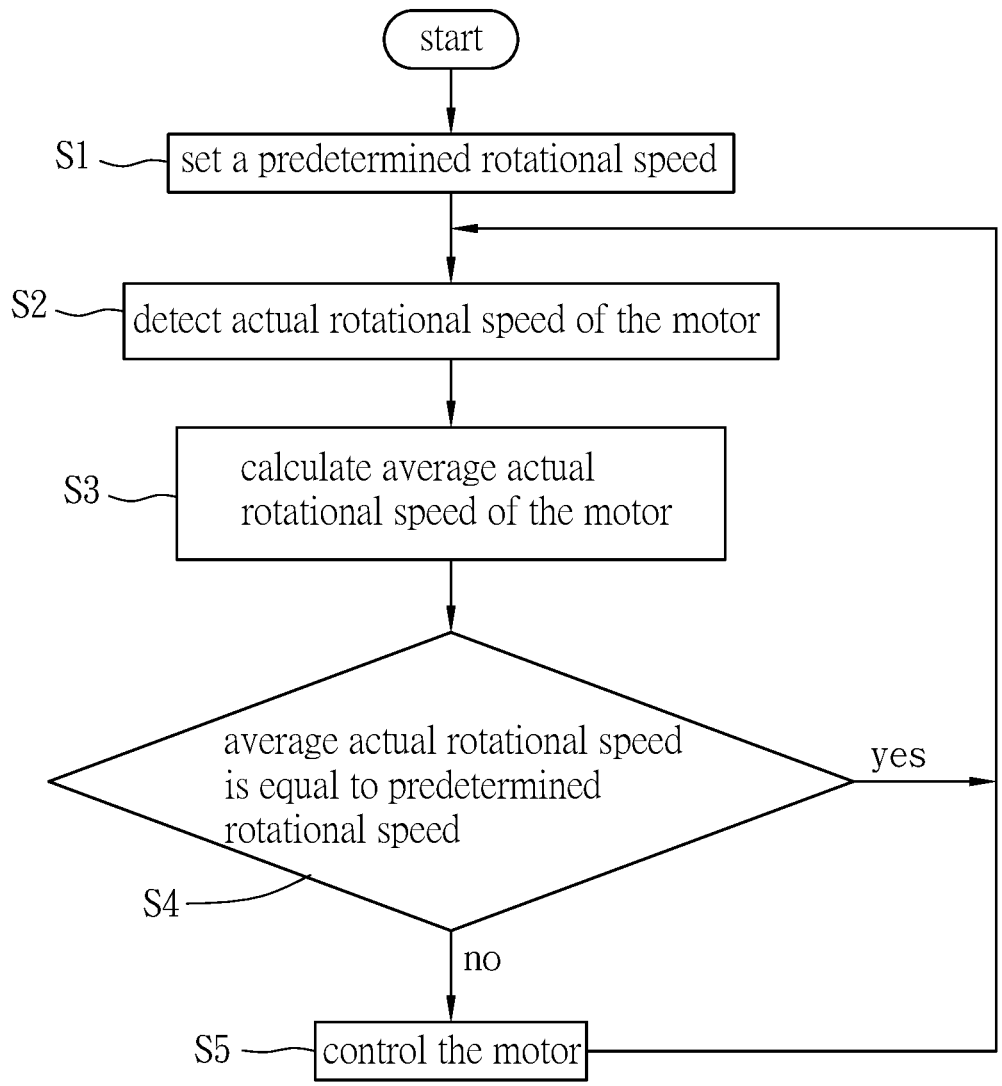
FIG. 2 is a flow chart showing the steps of the first embodiment of the present invention.

The method of controlling the rotational speed of the motor 5 of the electric bed according to the first embodiment is illustrated in FIG. 2 and instanced numerically in the following contents in cooperation with the following table 1. The maximum actual rotational speed of the motor 5 is 40 RPS, and the minimum actual rotational speed of the motor 5 is 0 RPS. While the motor 5 bears a normal load, the actual rotational speed of the motor 5 at the first second can reach the predetermined rotational speed, and it is assumed that the rotational speed of the motor 5 is reduced at the second second because of the increasing load of the electric bed. At first, the step S1 is performed through the input interface 30 to set a predetermined rotational speed to be 30 RPS in the microcontroller 12, and the predetermined period is set to be 10 seconds. The actual rotational speed of the motor is sampled one time in each second. The average actual rotational speed equals a total rotational speed divided by an accumulative time from the beginning of the predetermined period till the sampling time point when the average actual rotational speed is calculated, and the total rotational speed is the summation of the actual rotational speeds obtained from the beginning of the predetermined period till the sampling time point when the average actual rotational speed is calculated. The rotational speed of the motor 5 reaches the predetermined rotational speed right after the motor 5 is activated. Therefore, at the first second, i.e. the first sampling time point, the actual rotational speed of the motor 5 is obtained to be 30 RPS by the microcontroller 12 performing the step S2 to calculate the actual rotational speed of the motor 5 according to the sensing signal inputted from the sensor 11. After that, the average actual rotational speed at the first second is obtained to be 30 RPS (30/1=30) by the microcontroller 12 performing the step S3 to calculate the average actual rotational speed of the motor 5. After that, the microcontroller 12 performs the step S4 to compare the predetermined rotational speed with the average actual rotational speed. The comparison result indicates that the predetermined rotational speed is equal to the average actual rotational speed, so the procedure of the method returns to the step S2. In the step S2 the actual rotational speed of the motor 5 at the second second, i.e. the second sampling time point, calculated by the microcontroller 12 is 27 RPS, and then in the step S3 the average actual rotational speed at the second second, i.e. the second sampling time point, calculated by the microcontroller 12 is 28.5 RPS ((30+27)/2=28.5). After that, the step S4 is performed and has a comparison result indicating that the predetermined rotational speed is not equal to the average actual rotational speed, so the microcontroller 12 performs the step S5 to output a difference signal to the driver circuit 4. The difference signal is equal or proportional to the difference between the average actual rotational speed and the predetermined rotational speed. The driver circuit 4 adjusts a pulse width modulation signal according to the difference signal, to increase the voltage outputted to the motor 5 to accelerate the motor 5. After that, the procedure of the method returns to the step S2. In the step S2 the actual rotational speed of the motor 5 at the third second, i.e. the third sampling time point, calculated by the microcontroller 12 is 28 RPS, and then in the step S3 the average actual rotational speed at the third second, i.e. the third sampling time point, calculated by the microcontroller 12 is 28.3 RPS ((30+27+28)/3=28.3). After that, the procedure of performing the step S4 to do the comparison and the step S5 to do the control and then returning to the step S2 is repeated until the seventh second. At the seventh second, the step S4 performed by the microcontroller 12 has a comparison result indicating that the predetermined rotational speed is equal to the average actual rotational speed, so the procedure of the method returns to the step S2 and repeats the steps S2, S3 and S4 until the electric bed reaches the predetermined position.

In the following table 1 which shows the first embodiment, the unit of time is second, the units of the actual rotational speed of the motor and the average actual rotational speed are RPS, and the average actual rotational speed is rounded off to one decimal place.

TABLE 1

| | Time | | | | | | | | | |
|---|---|---|---|---|---|---|---|---|---|---|
| | 1 | 2 | 3 | 4 | 5 | 6 | 7 | 8 | 9 | 10 |
| Actual rotational speed of the motor | 30 | 27 | 28 | 30 | 32 | 32 | 31 | 30 | 30 | 30 |
| Average actual rotational speed | 30 | 28.5 | 28.3 | 28.8 | 29.4 | 29.8 | 30 | 30 | 30 | 30 |

Therefore, by controlling the average actual rotational speed of the motor to be equal to the predetermined rotational speed, the method of the present invention can make the rotational speed of the motor tend to be consistent, so as to provide the user the same usage experience in every time of using the electric bed.

The predetermined rotational speed is ranged between the maximum and the minimum actual rotational speeds of the motor, since the motor may be accelerated or decelerated during the control process.

Figure 3:
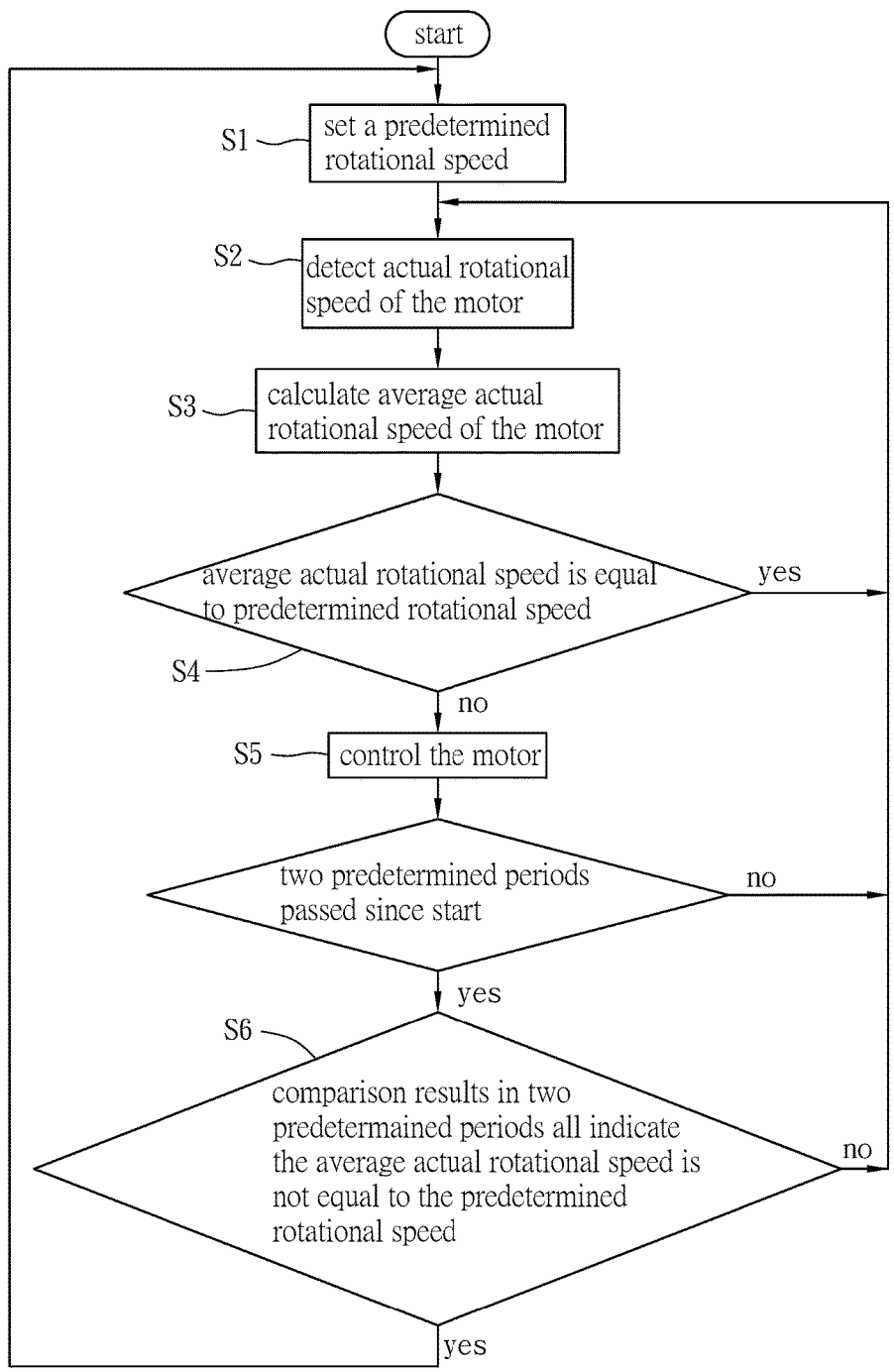
FIG. 3 is a flow chart showing the steps of a second embodiment of the present invention.

In the first embodiment, if the driver circuit 4 cannot make the average actual rotational speed become equal to the predetermined rotational speed even after adjusting the rotational speed of the motor 5 for several predetermined period, the related problem may be the predetermined rotational speed is set inappropriately, so that the predetermined rotational speed should be reset. To solve the above-mentioned problem, a second embodiment of the present invention provides a method as shown in FIG. 3. The second embodiment is similar to the first embodiment. However, after the step S5 in this second embodiment, the microcontroller 12 further performs the step S6 to detect whether the comparison results of the step S4 in several continuous predetermained periods (ex. two predetermained periods) all indicate that the average actual rotational speed is not equal to the predetermined rotational speed; if yes, the procedure of the method returns to the step S1 to reset the predetermined rotational speed to be a different value from the former value, such as a value lower than the former value of the predetermined rotational speed; if no, the procedure of the method returns to the step S2.

Figure 4:
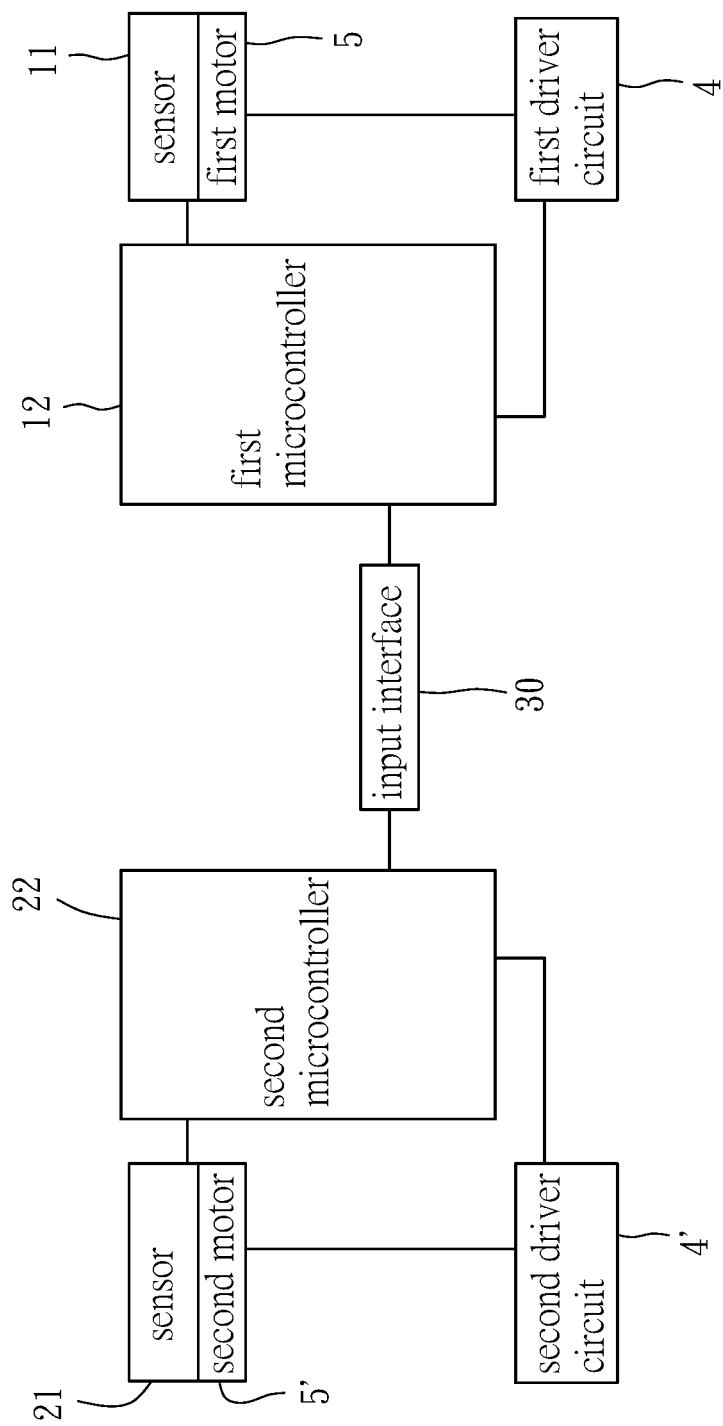
FIG. 4 is a schematic block diagram showing the electrical arrangement of a third embodiment of the present invention.

Referring to FIG. 4, a third embodiment of the present invention provides a method of controlling rotational speeds of motors of a double electric bed. The double electric bed includes first and second electric single beds disposed at the left and the right, respectively. The first electric single bed has a first motor 5, and a first driver circuit 4 electrically connected with the first motor 5 for controlling the rotation of the first motor 5. The second electric single bed has a second motor 5', and a second driver circuit 4' electrically connected with the second motor 5' for controlling the rotation of the second motor 5'. The electrical arrangement for the third embodiment includes first and second microcontrollers 12 and 22, two sensors 11 and 21 disposed in the first and second motors 5 and 5' respectively, and an input interface 30.

The first and second microcontrollers 12 and 22 are both the same with the microcontroller 12 shown in FIG. 1, and the connection relationships between the first and second microcontrollers 12 and 22, the first and second driver circuits 4 and 4', and the sensors 11 and 21 are the same as that shown in FIG. 1, so their detailed descriptions are omitted. The input interface 30 is electrically connected with the first and second microcontrollers 12 and 22 for inputting the predetermined rotational speeds, the predetermined periods, or the predetermined positions of the two electric single beds to the first and second microcontrollers 12 and 22.

The first and second microcontrollers 12 and 22 perform the same procedure as shown in FIG. 2 or FIG. 3. However, it should be noted that the difference between the third embodiment and other embodiments is that the input interface 30 transmits the same predetermined rotational speed and the same predetermined period to the first and second microcontrollers 12 and 22, so that the first and second microcontrollers 12 and 22 respectively control the first and second motors 5 and 5' to enable the average actual rotational speeds of the two motors 5 and 5' to be equal to the predetermined rotational speed in the predetermined period, thereby synchronizing motions of the two electric single beds.

The third embodiment is instanced numerically in the following table 2. The predetermined rotational speed is set to be 30 RPS, and the predetermined period is set to be 10 seconds. It is assumed that the initial positions of the first and second electric single beds are the same, and the load of the second electric single bed is larger than that of the first electric single bed after the second second, so that the actual rotational speed of the second motor 5' is lower than that of the first motor 5 after the second second. After the first and second microcontrollers 12 and 22 start to perform the procedure as shown in FIG. 2, the average actual rotational speed of the first motor 5 is equal to the predetermined rotational speed at the eighth second, and the actual rotational speed of the first motor 5 is maintained at the predetermined rotational speed afterwards; the average actual rotational speed of the second motor 5' is equal to the predetermined rotational speed at the ninth second, and the actual rotational speed of the second motor 5' is maintained at the predetermined rotational speed afterwards. In other words, the first and second motors 5 and 5' rotate the same number of revolutions in 10 seconds, so the distances the first and second motors 5 and 5' respectively drive the two electric single beds to move in the 10 seconds are equal to each other, so that the motions of the two electric single beds are synchronized.

Therefore, by controlling the first and second motors 5 and 5' to have equal average actual rotational speed in the predetermined period, the method of the present invention can synchronize the motions of the two electric single beds, so as to achieve the objective of making the double electric bed perform synchronized and fine motion.

In the following table 2 which shows the third embodiment, the unit of time is second, the units of the actual rotational speed and the average actual rotational speed of the motors are RPS, and the average actual rotational speed is rounded off to one decimal place.

TABLE 2

| | Time | | | | | | | | | |
|---|---|---|---|---|---|---|---|---|---|---|
| | 1 | 2 | 3 | 4 | 5 | 6 | 7 | 8 | 9 | 10 |
| Actual rotational speed of the first motor | 30 | 27 | 28 | 30 | 31 | 32 | 31 | 31 | 30 | 30 |
| Average actual rotational speed of the first motor | 30 | 28.5 | 28.3 | 28.8 | 29.2 | 29.7 | 29.9 | 30 | 30 | 30 |
| Actual rotational speed of the second motor | 30 | 25 | 27 | 29 | 31 | 32 | 33 | 32 | 31 | 30 |
| Average actual rotational speed of the second motor | 30 | 27.5 | 27.3 | 27.8 | 28.4 | 29 | 29.6 | 29.9 | 30 | 30 |

It is to be noted that the predetermined rotational speed and the predetermined periods can be directly set in the first and second microcontrollers. The input interface is the same with the wireless remote controller or the wired control box of the conventional electric bed. In the condition that the two microcontrollers of the third embodiment perform the method as shown in FIG. 3, so long as one of the first and second microcontrollers performing the step S6 detects that the comparison results of several continuous times of the step S4 all indicate the average actual rotational speed is not equal to the predetermined rotational speed, the predetermined rotational speed should be reset in the first and second microcontrollers at the same time.

The motor used in the present invention may, but not limited to, be a direct-current (DC) motor, such as a permanent-magnet DC brush motor. The sensor used in the present invention may, but not limited to, be the sensor capable of detecting the rotation of the motor, such as the Hall sensor or the grating sensor.

The above description represents merely the preferred embodiments of the present invention, without any intention to limit the scope of the present invention. The simple variations and modifications not to be regarded as a departure from the spirit of the invention are intended to be included within the scope of the following claims.

What is claimed is:

1. A method of controlling a rotational speed of a motor of an electric bed, the motor being driven and controlled by a driver circuit, the method comprising the steps of:
   (A) using a sensor to detect rotation of the motor to output a sensing signal, setting a predetermined rotational speed of the motor in a microcontroller, and using the microcontroller to calculate actual rotational speeds of the motor according to the sensing signal while the motor is in operation;
   (B) using the microcontroller to calculate an average actual rotational speed of the motor at each of sampling time points in a predetermined period, wherein the average actual rotational speed equals a total rotational speed divided by an accumulative time from beginning of the predetermined period till the sampling time point when the average actual rotational speed is calculated, and the total rotational speed is a summation of the actual rotational speeds obtained from the beginning of the predetermined period till the sampling time point when the average actual rotational speed is calculated;
   (C) using the microcontroller to compare the average actual rotational speed of the motor obtained at said each of the sampling time points with the predetermined rotational speed to obtain a difference signal; and
   (D) inputting the difference signal obtained at said each of the sampling time points to the driver circuit to adjust the rotational speed of the motor until the average actual rotational speed of the motor is equal to the predetermined rotational speed, such that the motor is controlled to rotate with a fixed number of revolutions within a predetermined time.

2. The method as claimed in claim 1, wherein the predetermined rotational speed is ranged between a maximum actual rotational speed and a minimum actual rotational speed of the motor.

3. The method as claimed in claim 1, wherein the motor is a permanent-magnet direct-current brush motor.

4. The method as claimed in claim 1, wherein the sensor is a Hall sensor.

5. The method as claimed in claim 1, further comprising a step of (E) resetting the predetermined rotational speed of the motor in the microcontroller after the step (D), and then returning to the step (B).

6. The method as claimed in claim 5, wherein the predetermined rotational speed is ranged between a maximum actual rotational speed and a minimum actual rotational speed of the motor.

7. The method as claimed in claim 5, wherein the motor is a permanent-magnet direct-current brush motor.

8. The method as claimed in claim 5, wherein the sensor is a Hall sensor.

9. A method of controlling rotational speeds of motors of an electric bed, the electric bed being a double electric bed having two electric single beds, two driver circuits and two said motors, the two driver circuits being attached to the two electric single beds respectively, the two motors being electrically connected with and driven and controlled by the two driver circuits respectively, the method comprising the steps of:
   (A) using two sensors to respectively detect rotations of the two motors to output two sensing signals respectively, setting predetermined rotational speeds of the two motors, which are equal to each other, in two microcontrollers respectively, and using the two microcontrollers to respectively calculate actual rotational speeds of the two motors according to the two sensing signals respectively while the motors are in operation;
   (B) using the two microcontrollers to respectively calculate average actual rotational speeds of the two motors at each of sampling time points in a predetermined period, wherein the average actual rotational speed equals a total rotational speed divided by an accumulative time from beginning of the predetermined period till the sampling time point when the average actual rotational speed is calculated, and the total rotational speed is a summation of the actual rotational speeds obtained from the beginning of the predetermined period till the sampling time point when the average actual rotational speed is calculated;

(C) using the two microcontrollers to respectively compare the average actual rotational speeds of the two motors obtained at said each of the sampling time points with the predetermined rotational speeds to obtain two difference signals respectively; and (D) inputting the two difference signals obtained at said each of the sampling time points to the two driver circuits respectively to adjust the rotational speeds of the motors until the average actual rotational speeds of the two motors are equal to the predetermined rotational speeds, such that the two motors are controlled to rotate with a fixed number of revolutions within a predetermined time, thereby synchronizing motions of the two electric single beds.

10. The method as claimed in claim 9, wherein the predetermined rotational speed is ranged between a maximum actual rotational speed and a minimum actual rotational speed of the motor.

11. The method as claimed in claim 9, wherein the motor is a permanent-magnet direct-current brush motor.

12. The method as claimed in claim 9, wherein the sensor is a Hall sensor.

13. The method as claimed in claim 9, further comprising a step of (E) resetting the predetermined rotational speeds of the two motors, which are equal to each other, in the two microcontrollers respectively after the step (D), and then returning to the step (B).

14. The method as claimed in claim 13, wherein the predetermined rotational speed is ranged between a maximum actual rotational speed and a minimum actual rotational speed of each of the two motors.

15. The method as claimed in claim 13, wherein each of the two motors is a permanent-magnet direct-current brush motor.

16. The method as claimed in claim 13, wherein each of the two sensors is a Hall sensor.

* * * * *